United States Patent [19]

Shimizu

[11] Patent Number: 5,146,459
[45] Date of Patent: Sep. 8, 1992

[54] ELECTRONIC EQUIPMENT WITH CHECK-SUM FUNCTION

[75] Inventor: Yutaka Shimizu, Yokohama, Japan

[73] Assignee: Canon Kabushiki Kaisha, Tokyo, Japan

[21] Appl. No.: 715,703

[22] Filed: Jun. 17, 1991

Related U.S. Application Data

[63] Continuation of Ser. No. 124,929, Nov. 24, 1987, abandoned.

[30] Foreign Application Priority Data

Nov. 28, 1986 [JP] Japan .................................. 61-282117

[51] Int. Cl.⁵ ............................................. G06F 11/08
[52] U.S. Cl. ..................................... 371/21.5; 371/53; 371/66
[58] Field of Search .................... 371/21.2, 21.1, 21.5, 371/53, 54, 66, 13, 15.1

[56] References Cited

U.S. PATENT DOCUMENTS

| | | | |
|---|---|---|---|
| 3,573,726 | 4/1971 | Towell | 371/54 |
| 3,745,316 | 7/1973 | Olah | 371/54 |
| 4,142,243 | 2/1979 | Bishop | 371/53 X |
| 4,354,251 | 10/1982 | Hellwig | 371/21 X |
| 4,355,390 | 10/1982 | Hellwig | 371/21 |
| 4,393,500 | 7/1983 | Imazeki | 371/13 |
| 4,646,307 | 2/1987 | Nishimura | 371/21 X |
| 4,691,319 | 9/1987 | Bose | 371/54 |
| 4,698,808 | 10/1987 | Ishii | 371/21 |
| 4,870,607 | 9/1989 | Ishizuka | 371/53 X |

FOREIGN PATENT DOCUMENTS 45156 3/1980 Japan .................................. 371/21.5

OTHER PUBLICATIONS

"Read–Only Array Data Checking", IBM TDB, vol. 28, No. 3, Aug. 1985 pp. 1163–1165.

*Primary Examiner*—Robert W. Beausoliel
*Attorney, Agent, or Firm*—Fitzpatrick, Cella, Harper & Scinto

[57] ABSTRACT

A data collector, a handy terminal or similar portable electronic equipment with check-sum function, in which circuits for check-sum function are provided separately from the central processing unit, in order to reduce the time required for check-sum procedure.

6 Claims, 2 Drawing Sheets

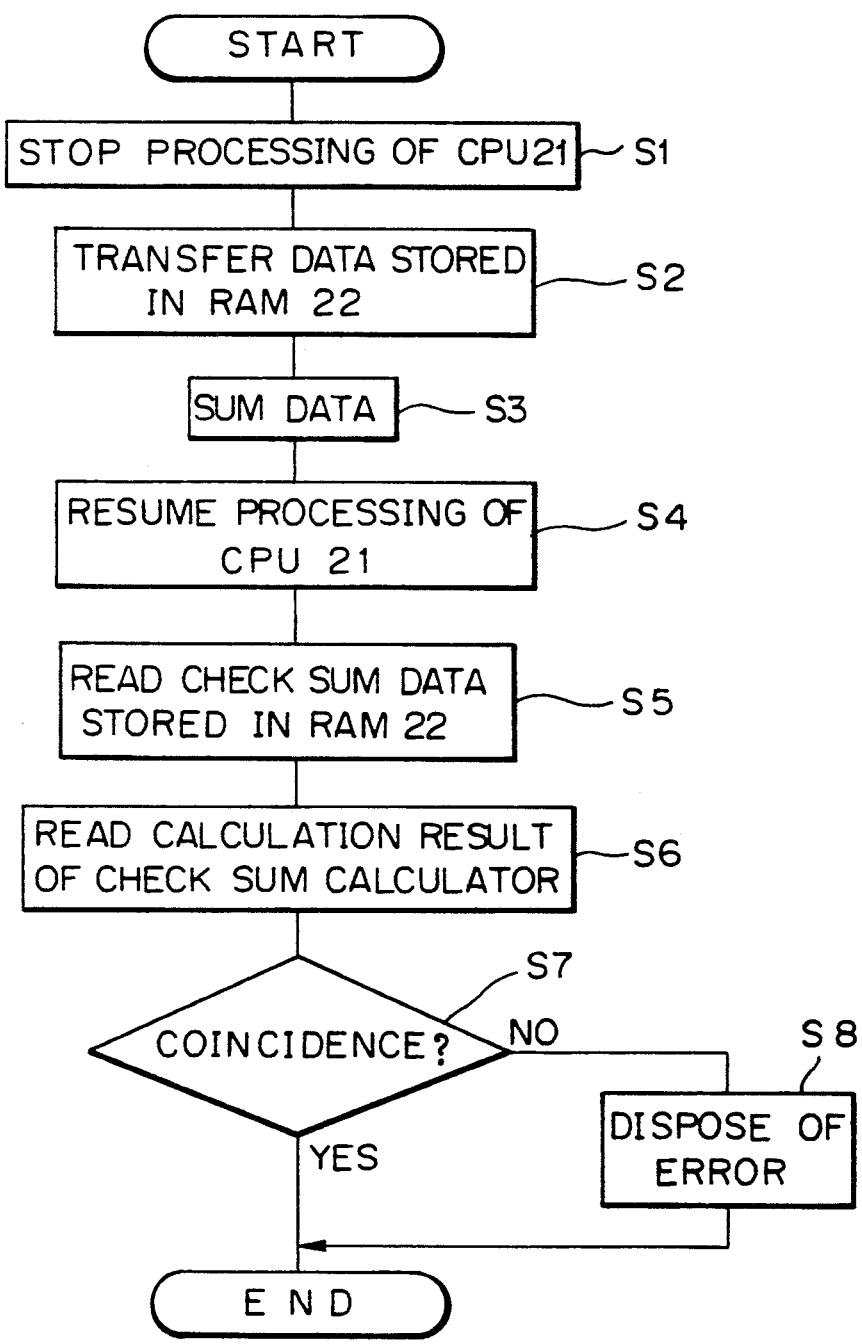

ELECTRONIC EQUIPMENT WITH CHECK-SUM FUNCTION

This application is a continuation of application Ser. No. 07/124,929 filed Nov. 24, 1987, now abandoned.

BACKGROUND OF THE INVENTION

1. Field of the Invention

The present invention relates to a portable electronic equipment such as a data collector or a handy terminal having a check-sum function for information processing.

2. Related Background Art

Such conventional electronic equipment is generally provided, as shown in FIG. 3, with a processor (CPU) 11 and a memory 12 such as RAM backed up by a battery 13. In maintaining the contents of the memory even when the external power supply is turned off, a sum of the contents, for example a sum of the bit signals, is calculated and stored, and the sum is newly calculated at the start of power supply and is compared with the stored sum in order to identify whether the contents of the entire memory are properly maintained.

Since such check-sum function has been achieved by the calculating capacity of the processor 11 itself, the time required for such check-sum procedure has evidently increased with the increase in the capacity of the memory 12.

SUMMARY OF THE INVENTION

In consideration of the foregoing, an object of the present invention is to provide an electronic equipment free from the drawbacks of the prior technology and capable of significantly reducing the time required for the check-sum procedure.

Another object of the present invention is to provide an electronic equipment provided with processing means for data processing, memory means for storing data related to the data processing; summing means for summing the data stored in the memory means at a first timing and a second timing; discrimination means for identifying that the data stored in the memory means are correct if the result of summing by the summing means at the second timing coincides with that at the first timing; and control means for temporarily suspending the data processing by the processing means at the summing operation by the summing means.

Still another object of the present invention is to provide an electronic equipment provided with a DMA controller and a check-sum calculating circuit in addition to a CPU thereby capable of reducing the calculating time required for the check-sum procedure.

Still another object of the present invention is to provide an electronic equipment in which the summing of data stored in the memory means for the purpose of check-sum procedure is not conducted by the processing means but by summing means at a first timing and a second timing while the function of the processing means is temporarily suspended by control means, and discrimination means identifies whether the data stored in the memory means are correct through the comparison of the results of summings of the data, thereby the calculating time required for the check-sum procedure can be reduced.

Still another object of the present invention is to provide an electronic equipment with check-sum function comprising:

memory means for storing data to be processed and a check-sum value of the data;

means for obtaining a new check-sum value of the data stored in the memory means;

comparator means for comparing the new check-sum value of the data stored in the memory means with the check-sum value stored in the memory means; and discrimination means for identifying that the data are correct in case of coincidence in the comparison by the comparator means.

Still another object of the present invention is to provide an electronic equipment with check-sum function comprising:

processing means for data processing;

memory means for storing data to be processed by the processing means and a check-sum value of the data;

means for obtaining a new check-sum value of the data stored in the memory means;

comparator means for comparing the new check-sum value of the data stored in the memory means with the check sum value stored in the memory means; and discrimination means for identifying that the data are correct in case of coincidence in the comparison by the comparator means.

Still another object of the present invention is to provide an electronic equipment with check-sum function comprising:

processing means for data processing;

memory means for storing data to be processed by the processing means and a check-sum value of the data;

means for obtaining a new check-sum value of the data stored in the memory means;

direct memory access means for transferring the data from the memory means to the check-sum obtaining means;

comparator means for comparing the new check-sum value of the data stored in the memory means with the check-sum value stored in the memory means; and discrimination means for identifying that the data are correct in case of coincidence in the comparison by the comparator means.

BRIEF DESCRIPTION OF THE DRAWINGS

FIG. 2 is a flow chart showing an example of the control procedure of the embodiment of the present invention.

DETAILED DESCRIPTION OF THE PREFERRED EMBODIMENTS

Now the present invention will be clarified in detail by an embodiment thereof shown in the attached drawings.

Figure 1:
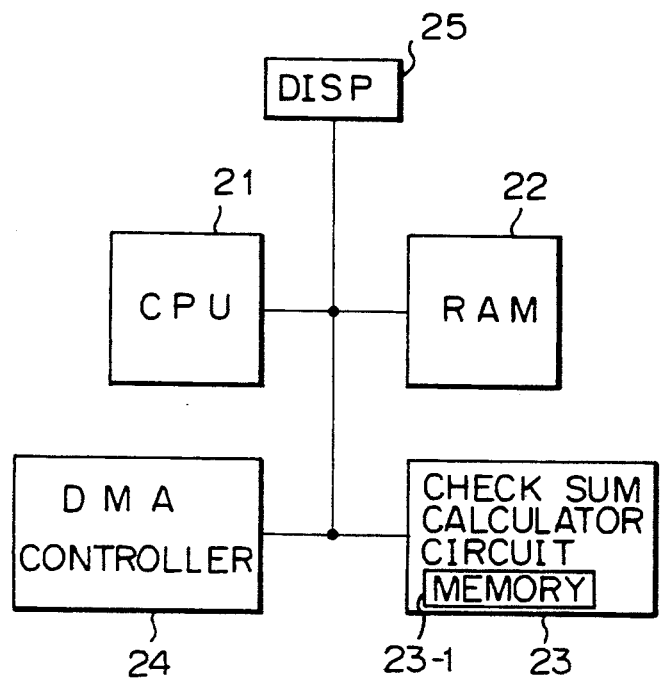
FIG. 1 is a block diagram showing an embodiment of the present invention.
Figure 3:
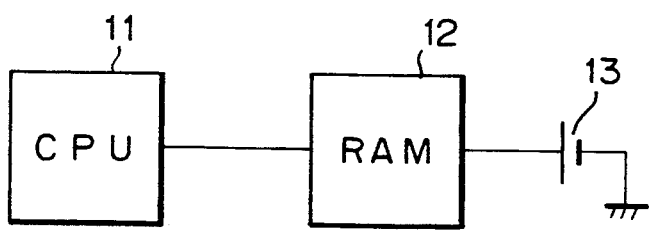
FIG. 3 is a block diagram showing an example of a conventional portable electronic equipment.

FIG. 1 shows an embodiment of the present invention, wherein shown are a CPU 21; a RAM 22; a check-sum calculating circuit 23 composed as a part of or independently from the CPU 21, for summing the data stored in the RAM 22; and a direct memory access (DMA) controller 24 for transferring data from the RAM 22 to the check-sum calculating circuit 23 without passing the CPU 21.

In the above-explained structure, the CPU 21 supplies the DMA controller 24 with calculating address and other information, and the CPU 21 is stopped by an interruption signal supplied by the DMA controller 24.

After the calculating operation by the RAM 22 and the check-sum calculating circuit 23, in response to the termination of operation of the DMA controller 24, the CPU 21 reads the previous result of calculation in the check-sum calculating circuit 23 thereby checking the contents of the RAM 22.

FIG. 2 shows an example of the control procedure in the embodiment of the present invention.

In FIG. 2, when the power supply is turned on, the DMA controller 24 supplies the CPU 21 with an interruption (hold) signal thereby stopping the function of the CPU 21 (step S1).

Then the DMA controller 24 transfers the data of the RAM 22 to the check-sum calculating circuit 23. The data tranfer is achieved by transfer of data from a predetermined area of the RAM 22 to the check-sum calculating circuit 23 (step S2).

In a step S3, the check-sum calculating circuit 23 sums the data supplied from the RAM 22. The data summing circuit and the procedure therefor are already well known and will not be explained in detail.

Upon completion of the check-sum calculation, the DMA controller 24 supplies, in a step S4, an interruption signal to the CPU 21 thereby restarting the function thereof. Then the CPU 21 reads a check-sum value stored in the RAM 22 before the start of power supply, and compares the value with a check-sum value calculated by the check-sum calculating circuit 23 (Steps S5-S7).

If these two check-sum values are identical, the data stored in the RAM 22 are identified correct and the control procedure is terminated. On the other hand, if these two values are not same, the data stored in the RAM 22 are identified erroneous, then an error disposal process is executed in a step S8 and the control procedure is terminated.

The error disposal process for example turns on an error lamp 25, or display warning message for a data error in the RAM 22, on a display unit 25. In the foregoing embodiment the check-sum procedure is executed at the start of power supply, but it may also be executed for example at a regular interval. It can be realized by stopping the CPU 21 with the DMA controller 24 at a predetermined interval and executing the above-explained procedure.

In case the data stored in the RAM 22 vary according to the processing by the CPU 21, it is possible to execute the procedure of the steps S1 to S4 shown in FIG. 2 prior to the turning-off of the power supply and to store the sum of the data, calculated by the check-sum calculating circuit 23, in the RAM 22 in addition to the above-explained procedure.

The above-explained function can be incorporated in a portable electronic equipment without expanding the CPU 21 and peripheral devices, by executing the DMA function inside the CPU itself and forming the check-sum calculating circuit with a gate array.

As explained above, the foregoing embodiment is capable of a check-sum calculation faster than in the CPU itself, since the check-sum calculating function is achieved by an exclusive hardware.

I claim:

1. An electronic apparatus with a check-sum function, said apparatus comprising:
  processing means for processing data;
  first memory means for storing data to be processed by said processing means;
  calculating means, independent of said processing means, for calculating a first check-sum value and a second check-sum value of the data stored in said first memory means;
  instruction means for instructing that power to said apparatus be turned off;
  first control means for controlling said calculating means to calculate the first check-sum value in response to the instruction that power be turned off;
  second memory means for storing the first check-sum value;
  second control means for controlling said calculating means to calculate the second check-sum value whenever power is turned on;
  comparator means for comparing the first check-sum value stored in said second memory means with the second check-sum value; and
  discrimination means for determining whether or not the data stored in said first memory means is correct when the first and second check-sum values are compared.

2. An electronic apparatus according to claim 1, wherein said processing means and said comparator means are included in a CPU.

3. An electronic apparatus according to claim 1, wherein said first and second control means interrupt said processing means when said calculating means calculates the first and second check-sum values.

4. An electronic apparatus with a check-sum function, said apparatus comprising:
  processing means for processing data;
  first memory means for storing data to be processed by said processing means;
  calculating means, independent of said processing means, for calculating a first check-sum value and a second check-sum value of the data stored in said first memory means;
  direct memory access means for transferring the date from said first memory means to said calculating means;
  instruction means for instructing that power to said apparatus be turned off;
  first control means for activating said direct memory access means in response to the instruction that power be turned off, to calculate the first check-sum value;
  second memory means for storing the first check-sum value;
  second control means for activating said direct memory access means whenever power is turned on, to calculate the second check-sum value;
  comparator means for comparing the first check-sum value stored in said second memory means with the second check-sum value; and
  discrimination means for determining whether or not the data stored in said first memory means is correct when the first and second check-sum values are compared.

5. An electronic apparatus according to claim 4, wherein said processing means and said comparator means are included in a CPU.

6. An electronic apparatus according to claim 4, wherein said direct memory access means interrupts said processing means when said calculating means calculates the first and second check-sum values.

* * * * *

UNITED STATES PATENT AND TRADEMARK OFFICE
CERTIFICATE OF CORRECTION

PATENT NO.  : 5,146,459
DATED       : September 8, 1992
INVENTOR(S) : YUTAKA SHIMIZU It is certified that error appears in the above-identified patent and that said Letters Patent is hereby corrected as shown below:

COLUMN 4

Line 39, "date" should read --data--.

COLUMN 1

Line 67, "check-sum" should read --a check-sum--.

COLUMN 2

Line 12, "check-sum" should read --a check-sum--.
Line 26, "check-sum" should read --a check-sum--.
Line 66, "address" should read --addresses--.

UNITED STATES PATENT AND TRADEMARK OFFICE
CERTIFICATE OF CORRECTION

PATENT NO. : 5,146,459
DATED : September 8, 1992
INVENTOR(S) : YUTAKA SHIMIZU

It is certified that error appears in the above-identified patent and that said Letters Patent is hereby corrected as shown below:

COLUMN 3

Line 9, "FIG. 2 ," should read --FIG. 2,--.
Line 15, "tranfer" should read --transfer--.
Line 33, "same" should read --the same--.

Signed and Sealed this

Twelfth Day of October, 1993

Attest:

BRUCE LEHMAN

Attesting Officer    Commissioner of Patents and Trademarks